(12) United States Patent
Nelson (10) Patent No.: US 7,926,034 B2
(45) Date of Patent: Apr. 12, 2011

(54) APPLICATION SOFTWARE FLIGHT RECORDER DEVELOPER CLIENT

(75) Inventor: Steve Nelson, San Jose, CA (US)

(73) Assignee: Seiko Epson Corporation, Tokyo (JP)

( * ) Notice: Subject to any disclaimer, the term of this patent is extended or adjusted under 35 U.S.C. 154(b) by 997 days.

(21) Appl. No.: 11/685,604

(22) Filed: Mar. 13, 2007

(65) Prior Publication Data

US 2008/0225986 A1    Sep. 18, 2008

(51) Int. Cl.
*G06F 9/44* (2006.01)

(52) U.S. Cl. ......................................................... 717/124

(58) Field of Classification Search .................... 717/124
See application file for complete search history.

(56) References Cited

U.S. PATENT DOCUMENTS

| | | | |
|---|---|---|---|
| 5,111,396 A * | 5/1992 | Mills et al. ........................ 710/1 |
| 6,237,138 B1 | 5/2001 | Hameluck et al. |
| 6,384,843 B1 | 5/2002 | Harel |
| 6,526,526 B1 | 2/2003 | Dong et al. |
| 7,010,726 B2 | 3/2006 | Faust et al. |
| 7,493,193 B2 * | 2/2009 | Hyland et al. ................. 700/275 |
| 7,685,271 B1 * | 3/2010 | Schneider et al. ............ 717/124 |
| 2002/0183995 A1 * | 12/2002 | Veitch et al. ....................... 703/7 |
| 2007/0028216 A1 * | 2/2007 | Boss et al. ..................... 717/124 |
| 2008/0141221 A1 * | 6/2008 | Benesovska et al. ......... 717/124 |

OTHER PUBLICATIONS

Tang et al. "DataGrove: Exploring Network Trace Data with Hierarchical Multi-dimensional Meta-data"; 2000; Standford University.*

* cited by examiner

*Primary Examiner* — Wei Y Zhen
*Assistant Examiner* — Junchun Wu (57) ABSTRACT

Apparatus having corresponding methods and computer-readable media comprises an input circuit to receive data over a communication channel, the data representing operation of a computer during an test interval and screen updates generated by the computer during the test interval; and a processor to generate a motion picture representing the test interval and contemporaneously comprising a stripchart area showing a first stripchart representing the operation of the computer based on the data, and a screen update area showing the screen updates represented by the second data stream; wherein the stripchart area and the screen update area are synchronized.

32 Claims, 6 Drawing Sheets

APPLICATION SOFTWARE FLIGHT RECORDER DEVELOPER CLIENT

BACKGROUND

The present invention relates generally to application software testing. More particularly, the present invention relates to collecting test data representing the operation of the software, tester interactions with the software, and computer status, including interactions with external devices such as printers, during testing, as well as presenting the test data to developers of the software.

Software testing is a critical but time-consuming task involving testers and developers. When a tester encounters a problem the first step is to document the problem so a developer can reproduce the problem. If the developer cannot reproduce the problem it is unlikely the problem will be fixed. When testers and developers are located in the same location, they at least have the opportunity to work together to try to find a way to reproduce the problem. Such interaction can help the developer but is time consuming, taking the tester away from the work of testing. When testers are located away from developers, it may be impossible for the developer to work efficiently with the tester to reproduce the problem. What is needed no matter where the testers are located is a tool so developers can see the tester's interaction with the program leading up to the problem.

SUMMARY

In general, in one aspect, the invention features an apparatus comprising: an input circuit to receive data over a communication channel, the data representing operation of a computer during an test interval and screen updates generated by the computer during the test interval; and a processor to generate a motion picture representing the test interval and contemporaneously comprising a stripchart area showing a first stripchart representing the operation of the computer based on the data, and a screen update area showing the screen updates represented by the second data stream; wherein the stripchart area and the screen update area are synchronized.

In some embodiments, the data further represents traffic exchanged over the communication channel by the computer during the test interval; wherein the stripchart area further shows a second stripchart representing the traffic exchanged over the communication channel by the computer based on the data; and wherein the stripchart area and the screen update area are synchronized. In some embodiments, the data received by the input circuit comprises a first data stream representing the operation of the computer during the test interval, and a second data stream representing the screen updates generated by the computer during the test interval; and wherein the first and second data streams are synchronized. In some embodiments, the data received by the input circuit further comprises a third data stream representing traffic exchanged over the communication channel by the computer during the test interval; and wherein the first, second, and third data streams are synchronized. In some embodiments, the data received by the input circuit comprises one or more data files. Some embodiments comprise a display circuit to generate a display signal representing the motion picture. In some embodiments, the computer comprises a second processor; wherein the input circuit receives, from the communication channel, second data representing utilization of the second processor; and wherein the stripchart area of the motion picture further shows a second stripchart representing the utilization of the second processor based on the second data. In some embodiments, the computer comprises a storage device; wherein the input circuit receives, from the communication channel, second data representing utilization of the storage device; and wherein the stripchart area of the motion picture further shows a second stripchart representing the utilization of the storage device based on the second data. In some embodiments, the computer comprises a memory; wherein the input circuit receives, from the communication channel, second data representing consumption of the memory; and wherein the stripchart area of the motion picture further shows a second stripchart representing the consumption of the memory based on the second data. In some embodiments, the computer comprises a capture circuit to generate capture signals representing audio of the tester and/or video of the tester; wherein the input circuit receives, from the communication channel, second data representing the capture signals; wherein the motion picture further contemporaneously comprises a video area rendering the audio and/or video based on the second data; and wherein the stripchart area, the screen update area, and the video area are synchronized. In some embodiments, the computer communicates with a remote device over the communication channel; wherein the input circuit receives, from the communication channel, second data representing operation of the remote device; and wherein the motion picture further shows a representation of the operation of the remote device based on the second data.

In general, in one aspect, the invention features an apparatus comprising: input means for receiving data over a communication channel, the data representing operation of a computer during an test interval and screen updates generated by the computer during the test interval; and processing means for generating a motion picture representing the test interval and contemporaneously comprising a stripchart area showing a first stripchart representing the operation of the computer based on the data, and a screen update area showing the screen updates represented by the second data stream; wherein the stripchart area and the screen update area are synchronized.

In some embodiments, the data further represents traffic exchanged over the communication channel by the computer during the test interval; wherein the stripchart area further shows a second stripchart representing the traffic exchanged over the communication channel by the computer based on the data; and wherein the stripchart area and the screen update area are synchronized. In some embodiments, the data received by the input means comprises a first data stream representing the operation of the computer during the test interval, and a second data stream representing the screen updates generated by the computer during the test interval; and wherein the first and second data streams are synchronized. In some embodiments, the data received by the input means further comprises a third data stream representing traffic exchanged over the communication channel by the computer during the test interval; and wherein the first, second, and third data streams are synchronized. In some embodiments, the data received by the input means comprises one or more data files. Some embodiments comprise display means for generating a display signal representing the motion picture. In some embodiments, the computer comprises a processor; wherein the input means receives, from the communication channel, second data representing utilization of the processor; and wherein the stripchart area of the motion picture further shows a second stripchart representing the utilization of the processor based on the second data. In some embodiments, the computer comprises a storage device; wherein the input means receives, from the communication channel, second data representing utilization of the storage device; and wherein the stripchart area of the motion picture further shows a second stripchart representing the utilization of the storage device based on the second data. In some embodiments, the computer comprises a memory; wherein the input means receives, from the communication channel, second data representing consumption of the memory; and wherein the stripchart area of the motion picture further shows a second stripchart representing the consumption of the memory based on the second data. In some embodiments, the computer comprises a capture circuit to generate capture signals representing audio of the tester and/or video of the tester; wherein the input means receives, from the communication channel, second data representing the capture signals; wherein the motion picture further contemporaneously comprises a video area rendering the audio and/or video based on the second data; and wherein the stripchart area, the screen update area, and the video area are synchronized. In some embodiments, the computer communicates with a remote device over the communication channel; wherein the input means receives, from the communication channel, second data representing operation of the remote device; and wherein the motion picture further shows a representation of the operation of the remote device based on the second data.

In general, in one aspect, the invention features a method comprising: receiving data over a communication channel, data representing operation of a computer during an test interval and screen updates generated by the computer during the test interval; and generating a motion picture representing the test interval and contemporaneously comprising a stripchart area showing a first stripchart representing the operation of the computer based on the data, and a screen update area showing the screen updates based on the data, wherein the stripchart area and the screen update area are synchronized.

In some embodiments, the data further represents traffic exchanged over the communication channel by the computer during the test interval; wherein the stripchart area further shows a second stripchart representing the traffic exchanged over the communication channel by the computer based on the data; and wherein the stripchart area and the screen update area are synchronized. In some embodiments, the data received from the communication channel comprises a first data stream representing the operation of the computer during the test interval, and a second data stream representing the screen updates generated by the computer during the test interval; and wherein the first and second data streams are synchronized. In some embodiments, the data received from the communication channel further comprises a third data stream representing traffic exchanged over the communication channel by the computer during the test interval; and wherein the first, second, and third data streams are synchronized. In some embodiments, the data received from the communication channel comprises one or more data files. Some embodiments comprise generating a display signal representing the motion picture. In some embodiments, wherein the computer comprises a processor, the method further comprises: receiving, from the communication channel, second data representing utilization of the processor; wherein the stripchart area of the motion picture further shows a second stripchart representing the utilization of the processor based on the second data. In some embodiments, the computer comprises a storage device, the method further comprising: receiving, from the communication channel, second data representing utilization of the storage device; and wherein the stripchart area of the motion picture further shows a second stripchart representing the utilization of the storage device based on the second data. In some embodiments, the computer comprises a memory, the method further comprising: receiving, from the communication channel, second data representing consumption of the memory; and wherein the stripchart area of the motion picture further shows a second stripchart representing the consumption of the memory based on the second data. In some embodiments, the computer comprises a capture circuit to generate capture signals representing audio of the tester and/or video of the tester, the method further comprising: receiving, from the communication channel, second data representing the capture signals; wherein the motion picture further contemporaneously comprises a video area rendering the audio and/or video based on the second data; and wherein the stripchart area, the screen update area, and the video area are synchronized. In some embodiments, the computer communicates with a remote device over the communication channel, the method further comprising: receiving, from the communication channel, second data representing operation of the remote device; wherein the motion picture further shows a representation of the operation of the remote device based on the second data.

In general, in one aspect, the invention features computer-readable media embodying instructions executable by a computer to perform a method comprising: receiving data over a communication channel, data representing operation of a computer during an test interval and screen updates generated by the computer during the test interval; and generating a motion picture representing the test interval and contemporaneously comprising a stripchart area showing a first stripchart representing the operation of the computer based on the data, and a screen update area showing the screen updates based on the data, wherein the stripchart area and the screen update area are synchronized.

In some embodiments, the data further represents traffic exchanged over the communication channel by the computer during the test interval; wherein the stripchart area further shows a second stripchart representing the traffic exchanged over the communication channel by the computer based on the data; and wherein the stripchart area and the screen update area are synchronized. In some embodiments, the data received from the communication channel comprises a first data stream representing the operation of the computer during the test interval, and a second data stream representing the screen updates generated by the computer during the test interval; and wherein the first and second data streams are synchronized. In some embodiments, the data received from the communication channel further comprises a third data stream representing traffic exchanged over the communication channel by the computer during the test interval; and wherein the first, second, and third data streams are synchronized. In some embodiments, the data received from the communication channel comprises one or more data files. Some embodiments comprise generating a display signal representing the motion picture. In some embodiments, the computer comprises a processor, and the method further comprises: receiving, from the communication channel, second data representing utilization of the processor; wherein the stripchart area of the motion picture further shows a second stripchart representing the utilization of the processor based on the second data. In some embodiments, the computer comprises a storage device, and the method further comprises: receiving, from the communication channel, second data representing utilization of the storage device; and wherein the stripchart area of the motion picture further shows a second stripchart representing the utilization of the storage device based on the second data. In some embodiments, the computer comprises a memory, and the method further comprises: receiving, from the communication channel, second data representing consumption of the memory; and wherein the stripchart area of the motion picture further shows a second stripchart representing the consumption of the memory based on the second data. In some embodiments, the computer comprises a capture circuit to generate capture signals representing audio of the tester and/or video of the tester, and the method further comprises: receiving, from the communication channel, second data representing the capture signals; wherein the motion picture further contemporaneously comprises a video area rendering the audio and/or video based on the second data; and wherein the stripchart area, the screen update area, and the video area are synchronized. In some embodiments, the computer communicates with a remote device over the communication channel, and the method further comprises: receiving, from the communication channel, second data representing operation of the remote device; wherein the motion picture further shows a representation of the operation of the remote device based on the second data.

The details of one or more implementations are set forth in the accompanying drawings and the description below. Other features will be apparent from the description and drawings, and from the claims.

The leading digit(s) of each reference numeral used in this specification indicates the number of the drawing in which the reference numeral first appears.

DETAILED DESCRIPTION

Embodiments of the present invention provide ways to collect test data representing the operation of application software, tester interactions with the software, and status of the computer executing the software, including interactions with external devices such as printers and the like. The computer status can include system statistics such as CPU load, memory consumption, disk space, and the like. The tester interactions can include mouse moves, keystrokes, screen updates, and the like. This information can be recorded to a running buffer, which is saved when desired, for example when a fault is detected, when the tester or developer elects, and the like.

Embodiments of the present invention also provide ways to present the recorded information in a form usable to developers of the software. According to some embodiments of the present invention, the recorded information is assembled into a motion picture. The motion picture can include video and audio of the tester, representations of tester input, the screen updates displayed to the tester, stripcharts of computer metrics such as CPU and memory utilization, communication channel usage, and the like, and video and audio of external devices such as printers, scanners and the like. The communication channel usage information can be collected by probes, such as network probes, that can be deployed locally and/or remotely.

In some embodiments, the recorded information is uploaded to a centralized server. The recorded information can be uploaded immediately, or saved for batch upload at a later time. A bug report can be generated that includes a link, such as a URL, to the recorded information. When a developer sees a new bug report, the developer can click on the URL to bring up a web browser page with an application playback window to show the motion picture. The developer can press a "play" button on the page to start playing the motion picture. A time marker can move across the page showing correspondence between elements of the motion picture, for example between the screen updates and the stripcharts, and the like. The developer can pause the playback, move the time marker to any point along the time line, and the like.

Many applications interact with remote devices such as printers, other computers, and the like, using communication channels such as IP channels, USB channels, and the like. In some embodiments, data probes are employed to collect information describing the traffic on the channels. The data probes are invisible to both the application and the remote computer or device while collecting test data representing conditions on the communication channel. A centralized server coordinates the data probes with the software running on the tester's computer. As before, a running buffer is kept of application interaction, local system statistics and now communication channel data. When a problem is encountered, the centralized server notifies the data probes. Information is then collected and packaged as before. When playing back the information, a developer can view the communication channel data at each time on the timeline and how it corresponds to the tester's interaction with the tested application.

Figure 1:
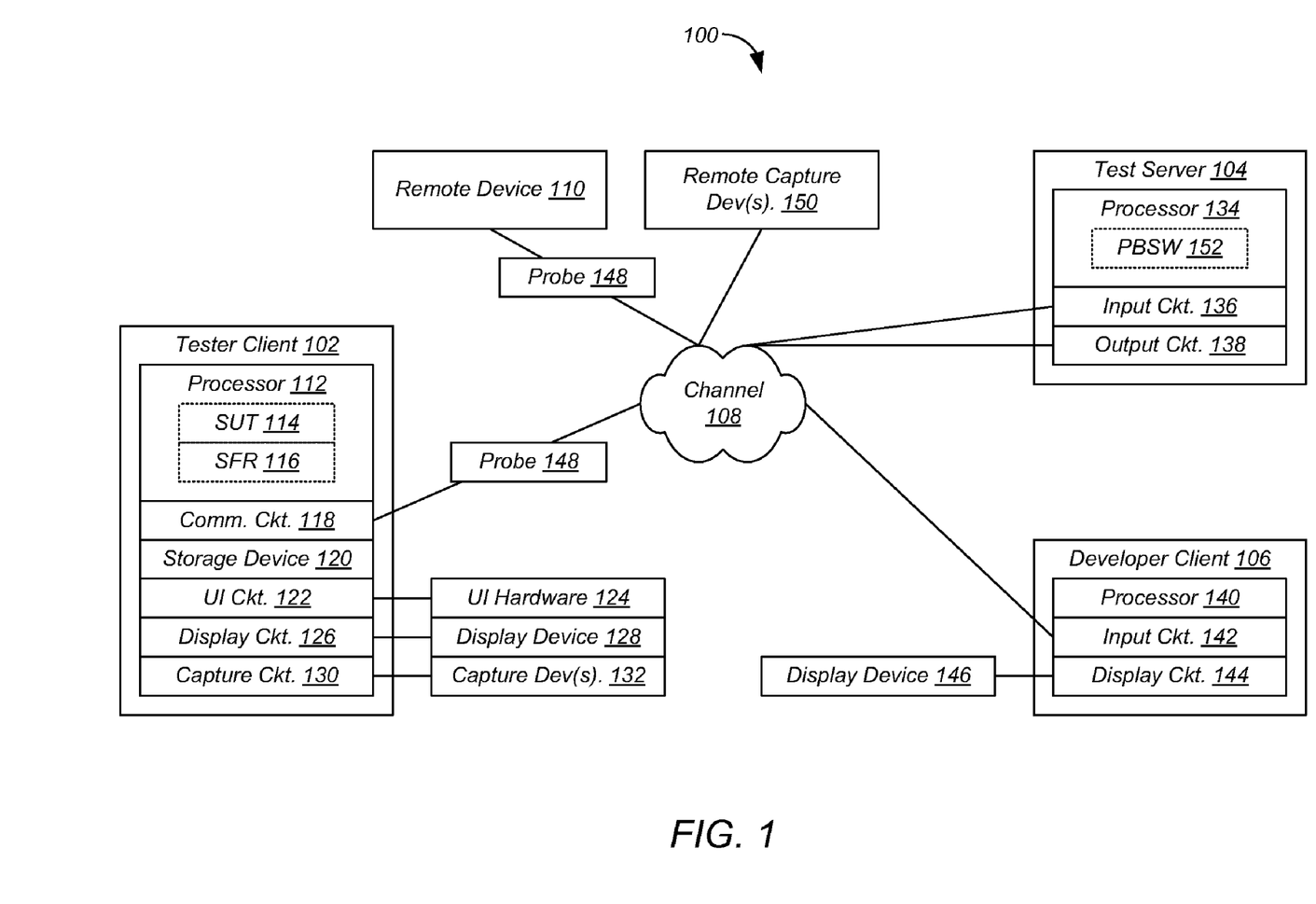
FIG. 1 shows a software application test system comprising a tester client in communication with a test server and a developer client over a communication channel according to some embodiments of the present invention.

FIG. 1 shows a software application test system 100 comprising a tester client 102 in communication with a test server 104 and a developer client 106 over a communication channel 108 according to some embodiments of the present invention. As used herein, the terms "client" and "server" generally refer to an electronic device or mechanism, and the term "message" generally refers to an electronic signal representing a digital message. As used herein, the term "mechanism" refers to hardware, software, or any combination thereof. These terms are used to simplify the description that follows. The clients, servers, and mechanisms described herein can be implemented on any standard general-purpose computer, or can be implemented as specialized devices. Furthermore, while some embodiments of the present invention are described with reference to a client-server paradigm, other embodiments employ other paradigms, such as peer-to-peer paradigms and the like.

In some embodiments, tester client 102 is also in communication with one or more remote devices 110 over communication channel 108. Communication channel 108 can include one or more networks, including wide-area networks such as the Internet, local-area networks (LAN), and the like, as well as direct links such as USB and the like. While embodiments of the present invention are described with respect to network communications, they are equally applicable to other forms of data communications such as direct links and the like.

Remote device(s) 110 can include computer peripheral devices such as printers, scanners, and the like, as well as other computers and the like. In some embodiments, one or more remote capture devices 150 are deployed to capture video, audio, and the like of the operation of remote device 110.

Tester client 102 includes a processor 112 to execute software applications including software under test (SUT) 114 and software flight recorder (SFR) 116, which records the operation of SUT 114. Tester client 102 also includes a communication circuit 118 to communicate over communication channel 108, a storage device 120, a user interface (UT) circuit 122 to communicate with UT hardware 124, a display circuit 126 to transmit signals to a display device 128, and a capture circuit 130 to receive signals from one or more capture devices 132. UT hardware 124 can include a keyboard, mouse, and the like. Capture devices 132 can include video cameras, microphones, and the like.

Test server 104 includes a processor 134 to execute playback software (PBSW) 152, an input circuit 136 in communication with communication channel 108, and an output circuit 138 in communication with communication channel 108. Developer client 106 can include a processor 140, an input circuit 142 in communication with communication channel 108, and a display circuit 144 in communication with a display device 146. Software application test system 100 can also include one or more channel probes 148 to collect information describing traffic on communication channel 108.

Although in the described embodiments, the elements of software application test system 100 are presented in one arrangement, other embodiments may feature other arrangements, as will be apparent to one skilled in the relevant arts based on the disclosure and teachings provided herein. For example, the elements of software application test system 100 can be implemented in hardware, software, or combinations thereof.

Figure 2:
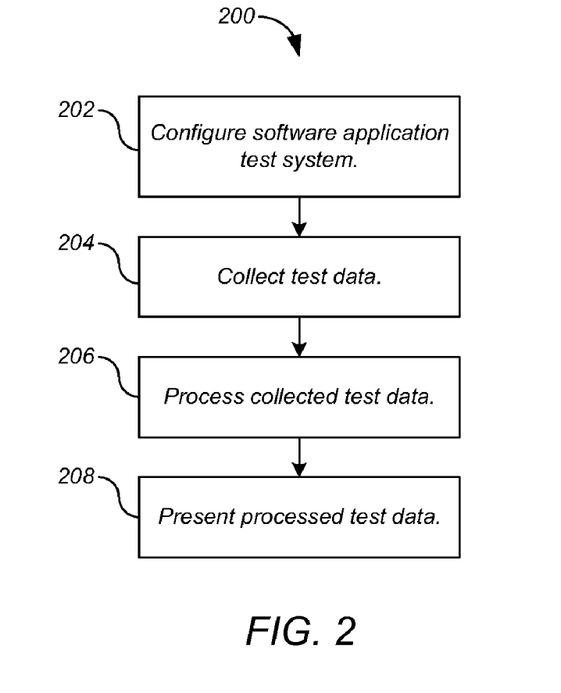
FIG. 2 shows a process for the software application test system of FIG. 1 according to some embodiments of the present invention.

FIG. 2 shows a process 200 for the software application test system 100 of FIG. 1 according to some embodiments of the present invention. Although in the described embodiments, the elements of process 200 are presented in one arrangement, other embodiments may feature other arrangements, as will be apparent to one skilled in the relevant arts based on the disclosure and teachings provided herein. For example, in various embodiments, some or all of the steps of process 200 can be executed in a different order, concurrently, and the like.

Referring to FIG. 2, process 200 begins with configuration of software application test system 100 (step 202). For example, communication connections are established between tester client 102 and test server 104 over communication channel 108. The tester logs into the system, and downloads and installs the latest version of SFR 116 if needed. Then process 200 begins test data collection (step 204).

Figure 3:
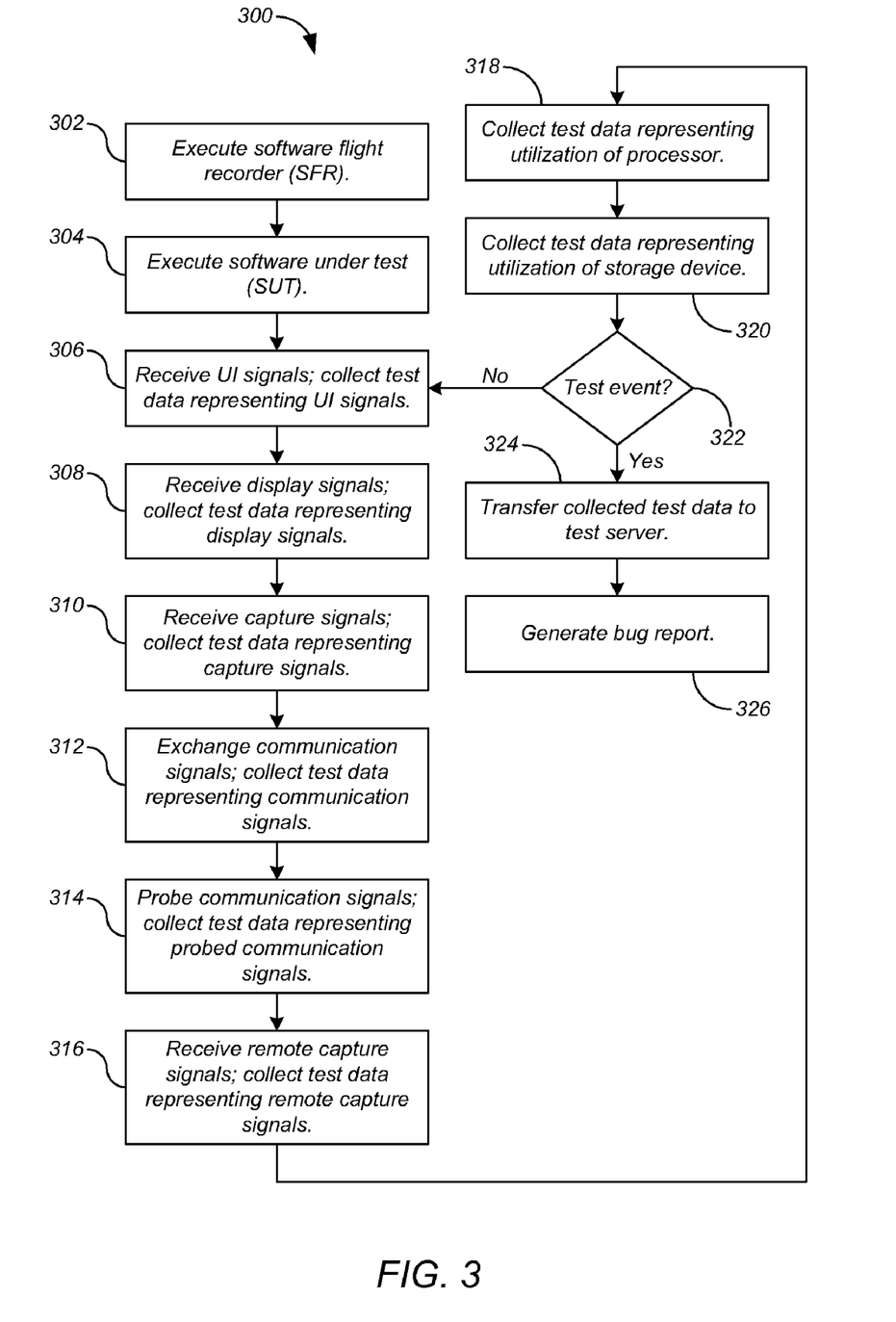
FIG. 3 shows a test data collection process for the software application test system of FIG. 1 according to some embodiments of the present invention.

FIG. 3 shows a test data collection process 300 for the software application test system 100 of FIG. 1 according to some embodiments of the present invention. Although in the described embodiments, the elements of process 300 are presented in one arrangement, other embodiments may feature other arrangements, as will be apparent to one skilled in the relevant arts based on the disclosure and teachings provided herein. For example, in various embodiments, some or all of the steps of process 300 can be executed in a different order, concurrently, and the like.

Referring to FIG. 3, processor 112 of tester client 102 executes software flight recorder (SFR) 116 (step 302). Processor 112 of tester client 102 also executes software under test (SUT) 114 (step 304). SFR 116 and/or SUT 114 can be launched automatically by tester client 102, for example when booting, under the control of a tester using tester client 102, remotely under the control of a developer using developer client 106, and the like.

As the tester interacts with SUT 114 using UT hardware 124 and display device 128, user interface circuit 122 receives UI signals representing the actions of the tester, and SFR 116 collects test data representing the UI signals (step 306). Display circuit 126 generates display signals representing a display produced in accordance with SUT 114, and SFR 116 collects test data representing the display signals (step 308).

In some embodiments, capture circuit 130 of tester client 102 captures signals from one or more capture devices such as video cameras and the like, and SFR 116 collects test data representing the capture signals (step 310). Capture devices 132 can be used to generate capture signals representing video and audio of the tester and local devices such as local printers and the like. For example, the tester can create voice notes during the test.

Communication circuit 118 exchanges communication signals over communication channel 108 in accordance with SUT 114, and SFR 116 collects test data representing the communication signals (step 312). In some embodiments, one or more channel probes 148 also collect data representing communication signals at remote locations, and SFR 116 collects test data representing the probed communication signals (step 314). For example, in embodiments where tester client 102 interacts with a remote device 110, a channel probe 148 can be deployed in communication channel 108 at or near the remote device 110. The probed data can represent traffic levels on communication channel 108 and the like.

In embodiments including one or more remote devices 110, one or more remote capture devices 150 can collect remote capture signals, such as audio, video, and the like, of remote device 110, and SFR 116 can collect test data representing the remote capture signals (step 316). In some embodiments, these remote capture signals can be collected by test server 104.

SFR 116 also collects test data representing operation of tester client 102. For example, SFR 116 can collect test data representing utilization of processor 112 (step 318) and utilization of storage device 120 (step 320).

In some embodiments, SFR 116 collects the data described above, for example in a circular buffer or the like, until a test event occurs (step 322). The test event can be automatically generated, for example as a fault of SUT 114, generated manually by the tester or developer, or in other ways. When a test event occurs, SFR 116 transfers the collected test data to test server 104 (step 324). The transfer can occur immediately after the test event, at a later time in a batch transfer mode, for example with test data collected at other times, and the like. In some embodiments, the tester fills out a test report which is transferred as part of the test data. The test report can include a brief description of the problem and the like.

In some embodiments, test server 104 generates a motion picture representing the test data, as described in detail below. In other embodiments, the motion picture is generated by SFR 116, and can be transferred to test server 104.

In some embodiments, SFR 116 also generates a bug report including a link to the location on test server 104 where the corresponding test data and/or the corresponding motion picture is stored (step 326). SFR 116 can transfer the bug report to the developer at developer client 106, to a bug database, and the like. In some embodiments, the link is created after the test data is uploaded to test server 104. For example, in embodiments where the motion picture is generated and stored by test server 104, test server 104 then creates the link to the motion picture.

Figure 4:
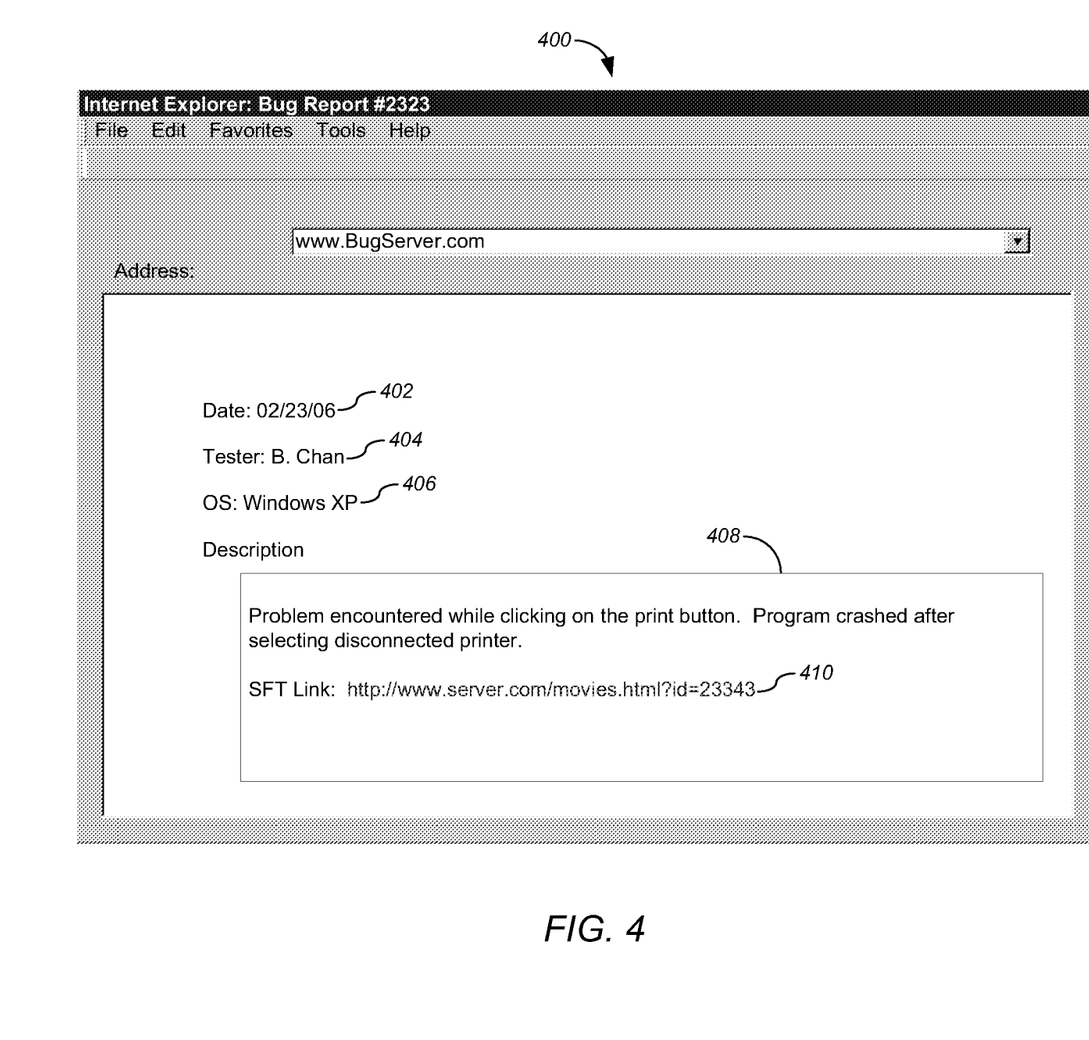
FIG. 4 shows a bug report according to some embodiments of the present invention.

FIG. 4 shows a bug report 400 according to some embodiments of the present invention. Bug report 400 includes the date 402, the name of the tester 404, the operating system 406 used by SUT 114, and a problem description 408 including the link 410.

Referring again to FIG. 2, after test data collection (step 204), process 200 processes the collected test data (step 206). While in the described embodiments, the collected test data is processed by test server 104, in other embodiments the test data is processed elsewhere. For example, the test data can be processed by tester client 102, thereby eliminating the need for test server 104.

Figure 5:
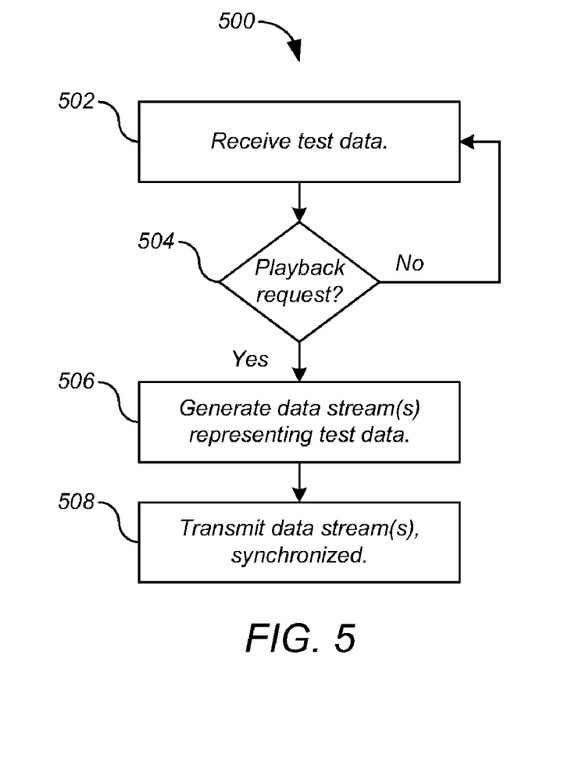
FIG. 5 shows a process for test data processing for the software application test system of FIG. 1 according to some embodiments of the present invention.

FIG. 5 shows a process 500 for test data processing for the software application test system 100 of FIG. 1 according to some embodiments of the present invention. Although in the described embodiments, the elements of process 500 are presented in one arrangement, other embodiments may feature other arrangements, as will be apparent to one skilled in the relevant arts based on the disclosure and teachings provided herein. For example, in various embodiments, some or all of the steps of process 500 can be executed in a different order, concurrently, and the like.

Referring to FIG. 5, input circuit 136 of test server 104 receives, over communication channel 108 from tester client 102, test data collected over a test interval (step 502). The test data can be transferred as one or more data files. For example, the test data for a test interval can include a data file representing operation of tester client 102 during the test interval, a data file representing screen updates generated by tester client 102 during the test interval, and a data file representing traffic exchanged over communication channel 108 by tester client 102 during the test interval. Test server 104 stores the files until a developer requests a playback of the test interval (step 504), for example by activating link 410 in bug report 400.

When requested (step 504), processor 134 of test server 104 generates one or more data streams representing the test data (step 506). For the previous example, the data streams can include a data stream representing operation of tester client 102 during the test interval, a data stream representing screen updates generated by tester client 102 during the test interval, and a data stream representing traffic exchanged over communication channel 108 by tester client 102 during the test interval.

Output circuit 138 transmits the data stream(s) over communication channel 108 (step 508) so that the data streams are synchronized when transmitted by output circuit 138. The synchronized data streams are used by developer client 106 to present a motion picture representing the test data for the test interval to the developer, as described in detail below. In some embodiments, the data streams are generated based on the test data when requested by a developer. In other embodiments, data stream files are created before receiving a request, and then the data stream files are streamed to the developer after the request is received.

In some embodiments, instead of generating and transmitting synchronized data streams to developer client 106, test server 104 generates one or more playback data files based on the test data files, and transfers the playback data files to developer client 106. For example, test server 104 generates one or more motion picture files, which are assembled, synchronized and played together as a single motion picture by developer client 106, as described in detail below.

Referring again to FIG. 2, after processing the collected test data (step 206), process 200 presents the processed test data (step 208). While in the described embodiments, the test data is presented by developer client 106, in other embodiments the test data is presented elsewhere. For example, the test data can be presented by tester client 102, thereby eliminating the need for developer client 106.

Figure 6:
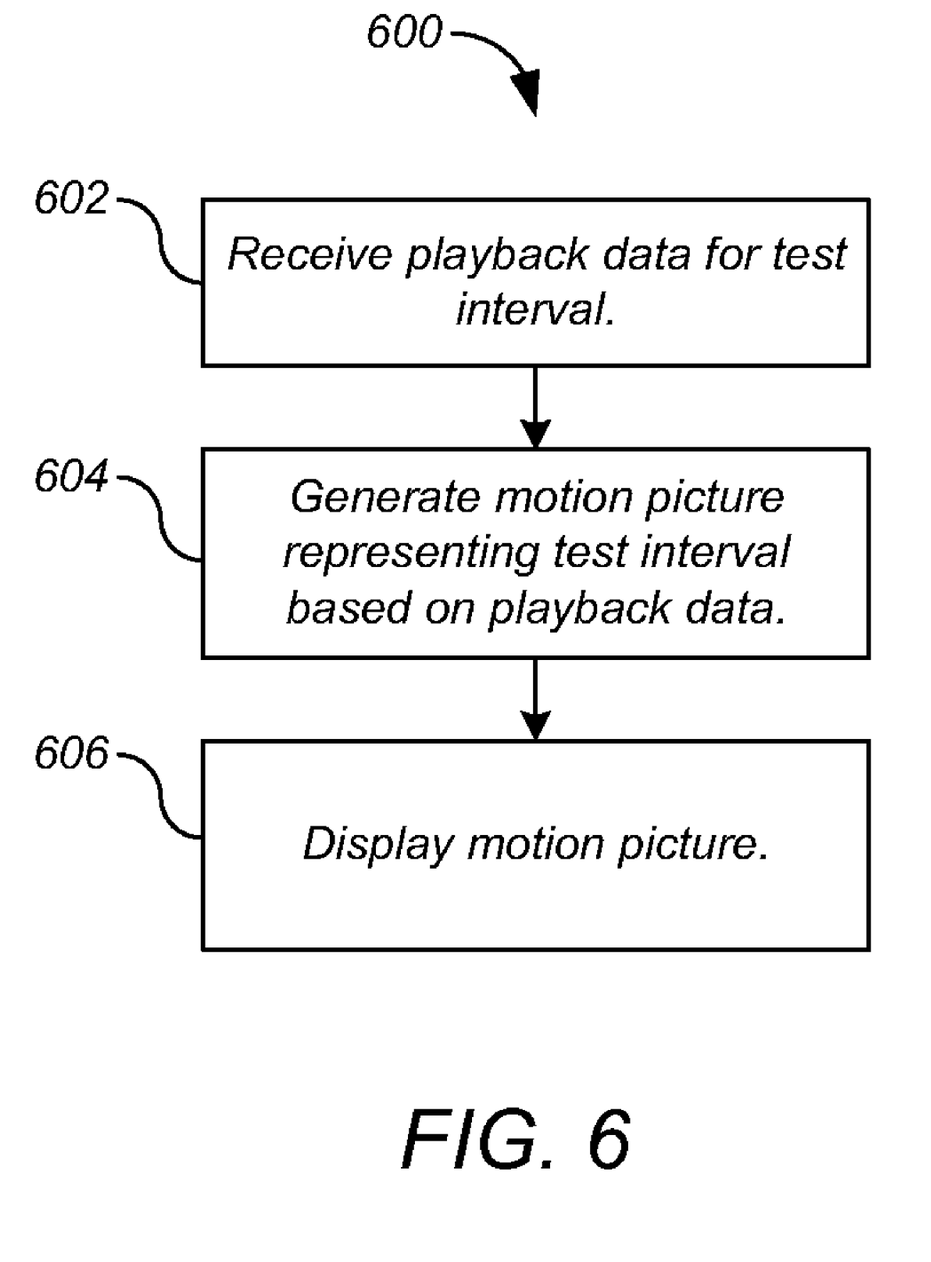
FIG. 6 shows a process for test data presentation for the software application test system of FIG. 1 according to some embodiments of the present invention.

FIG. 6 shows a process 600 for test data presentation for the software application test system 100 of FIG. 1 according to some embodiments of the present invention. Although in the described embodiments, the elements of process 600 are presented in one arrangement, other embodiments may feature other arrangements, as will be apparent to one skilled in the relevant arts based on the disclosure and teachings provided herein. For example, in various embodiments, some or all of the steps of process 600 can be executed in a different order, concurrently, and the like.

Referring to FIG. 6, input circuit 142 of developer client 106 receives playback data for a test interval over communication channel 108 (step 602). For example, the playback data can represent operation of tester client 102 during the test interval, screen updates generated by tester client 102 during the test interval, and traffic exchanged over communication channel 108 by tester client 102 during the test interval. The playback data can be received in the form of synchronized data streams, data files, and the like.

Processor 140 of developer client 106 executes playback software (PBSW) 152, which generates a motion picture representing the test interval based on the playback data (step 604). For example, according to some embodiments of the present invention, the motion picture contemporaneously includes a stripchart area showing a stripchart representing the operation of tester client 102 and traffic exchanged over communication channel 108 by tester client 102, and a screen update area showing screen updates for tester client 102, where the stripchart area and the screen update area are synchronized. Playback software 152 displays the motion picture on display device 146 (step 606). In particular, display circuit 144 of developer client 106 generates a display signal representing the motion picture, which is rendered as a display by display device 146.

Figure 7:
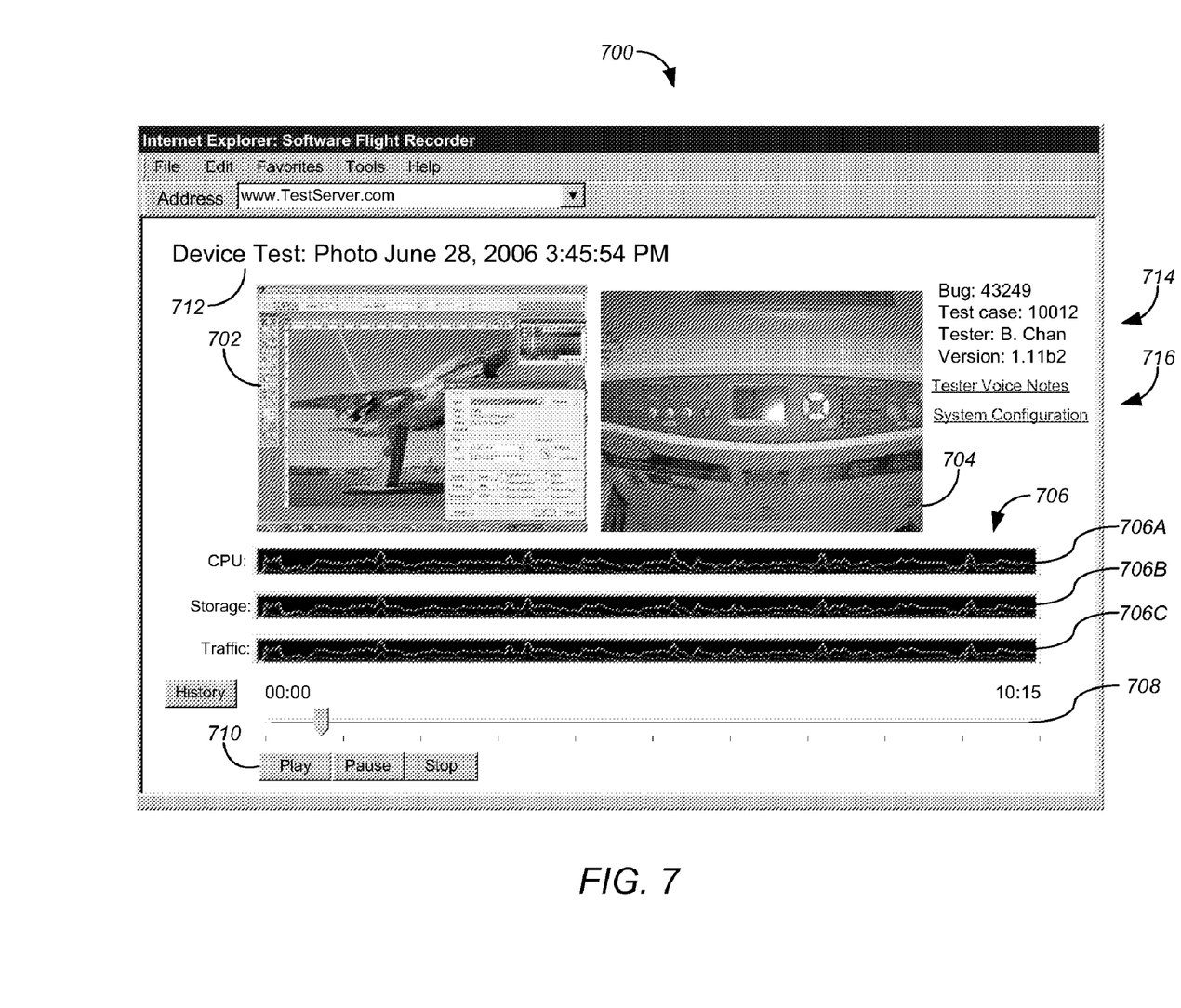
FIG. 7 shows a screenshot of an example motion picture according to some embodiments of the present invention.

FIG. 7 shows a screenshot 700 of an example motion picture according to some embodiments of the present invention. Screenshot 700 includes a screen update area 702 to show screen updates for tester client 102 during the test interval, a video area 704 to present video and/or audio of a remote device 110 (in this case, an all-in-one printer) during the test interval, and a stripchart area 706 showing three stripcharts 706A-C representing test data collected during the test interval. Stripchart 706A represents utilization of processor 112 of tester client 102 during the test interval. Stripchart 706B represents utilization of storage device 120 of tester client 102 during the test interval. Stripchart 706C represents traffic on communication channel 108 during the test interval. In other embodiments, the motion picture can present other sorts of test data, as will be apparent to one skilled in the relevant arts based on the disclosure and teachings provided herein.

In the motion picture, the test data presented is synchronized. For the example of FIG. 7, screen update area 702, video area 704, and stripchart area 706 are synchronized with each other so that, at any moment, the motion picture presents test data that occurred contemporaneously. Some embodiments include a common timeline 708 and control buttons 710 that can be manipulated to control playback of the motion picture. The motion picture can also include a test name 712 and test information 714 such as a bug number, test case number, tester name, and software version number. The motion picture can also include links 716 to tester voice notes, system configuration, and the like.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. An apparatus comprising:
an input circuit to receive first and second data over a communication channel, the first data comprising a first data stream representing operation of a computer during a test interval and a second data stream representing screen updates generated by the computer during the test interval, the first and second data streams being synchronized, and the second data representing operation of a remote device in communication with the computer; and
a processor to generate a motion picture representing the test interval and contemporaneously comprising
a stripchart area showing a first stripchart representing the operation of the computer based on the first data,
a screen update area showing the screen updates represented by a data stream, and
a video area rendering audio and/or video of the remote device based on the second data;
wherein the stripchart area, the screen update area and the video area are synchronized.

2. The apparatus of claim 1:
wherein the first data further represents traffic exchanged over the communication channel by the computer during the test interval;
wherein the stripchart area further shows a second stripchart representing the traffic exchanged over the communication channel by the computer based on the first data; and
wherein the stripchart area and the screen update area are synchronized.

3. The apparatus of claim 1:
wherein the first data received by the input circuit further comprises a third data stream representing traffic exchanged over the communication channel by the computer during the test interval; and
wherein the first, second, and third data streams are synchronized.

4. The apparatus of claim 1:
wherein the first data received by the input circuit comprises one or more data files.

5. The apparatus of claim 1, further comprising:
a display circuit to generate a display signal representing the motion picture.

6. The apparatus of claim 1:
wherein the computer comprises a second processor;
wherein the input circuit receives, from the communication channel, third data representing utilization of the second processor; and
wherein the stripchart area of the motion picture further shows a second stripchart representing the utilization of the second processor based on the third data.

7. The apparatus of claim 1:
wherein the computer comprises a storage device;
wherein the input circuit receives, from the communication channel, third data representing utilization of the storage device; and
wherein the stripchart area of the motion picture further shows a second stripchart representing the utilization of the storage device based on the third data.

8. The apparatus of claim 1:
wherein the computer comprises a memory;
wherein the input circuit receives, from the communication channel, third data representing consumption of the memory; and
wherein the stripchart area of the motion picture further shows a second stripchart representing the consumption of the memory based on the third data.

9. An apparatus comprising:
input means for receiving first and second data over a communication channel, the first data comprising a first data stream representing operation of a computer during a test interval and a second data stream representing screen updates generated by the computer during the test interval, the first and second data streams being synchronized, and the second data representing operation of a remote device in communication with the computer; and
processing means for generating a motion picture representing the test interval and contemporaneously comprising
a stripchart area showing a first stripchart representing the operation of the computer based on the first data,
a screen update area showing the screen updates represented by a data stream, and
a video area rendering audio and/or video of the remote device based on the second data;
wherein the stripchart area, the screen update area and the video area are synchronized.

10. The apparatus of claim 9:
wherein the first data further represents traffic exchanged over the communication channel by the computer during the test interval;

wherein the stripchart area further shows a second stripchart representing the traffic exchanged over the communication channel by the computer based on the first data; and wherein the stripchart area and the screen update area are synchronized.

11. The apparatus of claim 9:

wherein the first data received by the input means further comprises a third data stream representing traffic exchanged over the communication channel by the computer during the test interval; and wherein the first, second, and third data streams are synchronized.

12. The apparatus of claim 9:

wherein the first data received by the input means comprises one or more data files.

13. The apparatus of claim 9, further comprising:

display means for generating a display signal representing the motion picture.

14. The apparatus of claim 9:

wherein the computer comprises a processor;

wherein the input means receives, from the communication channel, third data representing utilization of the processor; and wherein the stripchart area of the motion picture further shows a second stripchart representing the utilization of the processor based on the third data.

15. The apparatus of claim 9:

wherein the computer comprises a storage device;

wherein the input means receives, from the communication channel, third data representing utilization of the storage device; and wherein the stripchart area of the motion picture further shows a second stripchart representing the utilization of the storage device based on the third data.

16. The apparatus of claim 9:

wherein the computer comprises a memory;

wherein the input means receives, from the communication channel, third data representing consumption of the memory; and wherein the stripchart area of the motion picture further shows a second stripchart representing the consumption of the memory based on the third data.

17. A method comprising:

receiving first and second data over a communication channel, the first data comprising a first data stream representing operation of a computer during a test interval and a second data stream representing screen updates generated by the computer during the test interval, the first and second data streams being synchronized, and the second data representing operation of a remote device in communication with the computer; and generating a motion picture representing the test interval and contemporaneously comprising
 a stripchart area showing a first stripchart representing the operation of the computer based on the first data,
 a screen update area showing the screen updates based on the first data, and
 a video area rendering audio and/or video of the remote device based on the second data;
 wherein the stripchart area, the screen update area and the video area are synchronized.

18. The method of claim 17:

wherein the first data further represents traffic exchanged over the communication channel by the computer during the test interval;

wherein the stripchart area further shows a second stripchart representing the traffic exchanged over the communication channel by the computer based on the first data; and wherein the stripchart area and the screen update area are synchronized.

19. The method of claim 17:

wherein the first data received from the communication channel further comprises a third data stream representing traffic exchanged over the communication channel by the computer during the test interval; and wherein the first, second, and third data streams are synchronized.

20. The method of claim 17:

wherein the first data received from the communication channel comprises one or more data files.

21. The method of claim 17, further comprising:

generating a display signal representing the motion picture.

22. The method of claim 17, wherein the computer comprises a processor, the method further comprising:

receiving, from the communication channel, third data representing utilization of the processor;

wherein the stripchart area of the motion picture further shows a second stripchart representing the utilization of the processor based on the third data.

23. The method of claim 17, wherein the computer comprises a storage device, the method further comprising:

receiving, from the communication channel, third data representing utilization of the storage device; and wherein the stripchart area of the motion picture further shows a second stripchart representing the utilization of the storage device based on the third data.

24. The method of claim 17, wherein the computer comprises a memory, the method further comprising:

receiving, from the communication channel, third data representing consumption of the memory; and wherein the stripchart area of the motion picture further shows a second stripchart representing the consumption of the memory based on the third data.

25. Non-transitory computer-readable media embodying instructions executable by a computer to perform a method comprising:

receiving first and second data over a communication channel, the first data comprising a first data stream representing operation of a computer during a test interval and a second data stream representing screen updates generated by the computer during the test interval, the first and second data streams being synchronized, and the second data representing operation of a remote device in communication with the computer; and generating a motion picture representing the test interval and contemporaneously comprising
 a stripchart area showing a first stripchart representing the operation of the computer based on the first data,
 a screen update area showing the screen updates based on the first data, and
 a video area rendering audio and/or video of the remote device based on the second data;
 wherein the stripchart area, the screen update area and the video area are synchronized.

26. The non-transitory computer-readable media of claim 25:

wherein the first data further represents traffic exchanged over the communication channel by the computer during the test interval;

wherein the stripchart area further shows a second stripchart representing the traffic exchanged over the communication channel by the computer based on the first data; and wherein the stripchart area and the screen update area are synchronized.

27. The non-transitory computer-readable media of claim 25:

wherein the first data received from the communication channel further comprises a third data stream representing traffic exchanged over the communication channel by the computer during the test interval; and wherein the first, second, and third data streams are synchronized.

28. The non-transitory computer-readable media of claim 25:

wherein the first data received from the communication channel comprises one or more data files.

29. The non-transitory computer-readable media of claim 25, wherein the method further comprises:

generating a display signal representing the motion picture.

30. The non-transitory computer-readable media of claim 25, wherein the computer comprises a processor, and wherein the method further comprises:

receiving, from the communication channel, third data representing utilization of the processor;

wherein the stripchart area of the motion picture further shows a second stripchart representing the utilization of the processor based on the third data.

31. The non-transitory computer-readable media of claim 25, wherein the computer comprises a storage device, and wherein the method further comprises:

receiving, from the communication channel, third data representing utilization of the storage device; and wherein the stripchart area of the motion picture further shows a second stripchart representing the utilization of the storage device based on the third data.

32. The non-transitory computer-readable media of claim 25, wherein the computer comprises a memory, and wherein the method further comprises:

receiving, from the communication channel, third data representing consumption of the memory; and wherein the stripchart area of the motion picture further shows a second stripchart representing the consumption of the memory based on the third data.

* * * * *